United States Patent [19]
Ueda

[11] Patent Number: 5,633,758
[45] Date of Patent: May 27, 1997

[54] VARIABLE MAGNIFICATION LENS SYSTEM

[75] Inventor: Toshihiko Ueda, Toyokawa, Japan

[73] Assignee: Minolta Co., Ltd., Osaka, Japan

[21] Appl. No.: 529,164

[22] Filed: Sep. 15, 1995

[30] Foreign Application Priority Data

Sep. 21, 1994 [JP] Japan .................................. 6-226134

[51] Int. Cl.⁶ .................................................. G02B 15/14
[52] U.S. Cl. ........................................ 359/679; 359/692
[58] Field of Search ................................ 359/771, 692, 359/679, 782, 689

[56] References Cited

U.S. PATENT DOCUMENTS

| | | | |
|---|---|---|---|
| 4,029,396 | 6/1977 | Shenker | 359/771 |
| 4,787,718 | 11/1988 | Cho | 359/692 |
| 4,832,465 | 5/1989 | Arai et al. | 359/679 |
| 4,936,661 | 6/1990 | Betensky et al. | 359/692 |
| 5,363,243 | 11/1994 | Takayuki et al. | 359/689 |

FOREIGN PATENT DOCUMENTS 0262513 10/1989 Japan .
0039918 2/1991 Japan .

*Primary Examiner*—Scott J. Sugarman
*Attorney, Agent, or Firm*—Price, Gess & Ubell

[57] ABSTRACT

A variable magnification lens system of the invention has from the object side a positive first lens unit and a negative second lens unit. The first lens unit includes a negative first lens element and a positive second lens element. The negative second lens unit includes a positive third lens element and a negative fourth lens element. At variable magnification from an equal magnification (1:1) state to an enlargement state, the overall lens system moves while the spacing between the two lens units is increased, and the distance between the object and the image remains constant. The object side surface of the first lens element and the image side surface of the fourth lens element are concave. Aspherical surfaces are provided on both surfaces of the first lens element and the image side surface of the third lens unit. The focal length of the first lens element and fourth lens element are suitable stipulated by a condition.

14 Claims, 5 Drawing Sheets

FNo/10.2

SPHERICAL ABERRATION
SINE CONDITION $\omega = 19.7$

ASTIGMATISM $\omega = 19.7°$

DISTORTION %

FNo/9.0

SPHERICAL ABERRATION
SINE CONDITION $\omega = 15.1°$

ASTIGMATISM $\omega = 15.1°$

DISTORTION %

FNo / 9.0

-5.0    5.0

SPHERICAL ABERRATION
SINE CONDITION

ω = 15.1°

DS ———— d
DT ----- d

-5.0    5.0

ASTIGMATISM

ω = 15.1°

-0.5  0  0.5

DISTORTION %

FNo / 10.2

-2.0    2.0

SPHERICAL ABERRATION
SINE CONDITION

ω = 19.7°

DS ———— d
DT ----- d

-2.0    2.0

ASTIGMATISM

ω = 19.7°

-0.5  0  0.5

DISTORTION %

FNo/9.0
— d
—·— F
—··— C
----- SC
-2.0  2.0
SPHERICAL ABERRATION
SINE CONDITION $\omega = 15.1°$
DS ——— d
DT ----- d
-2.0  2.0
ASTIGMATISM $\omega = 15.1°$
-0.5  0  0.5
DISTORTION FNo/9.0
— d
—·— F
—··— C
----- SC
-5.0  5.0
SPHERICAL ABERRATION
SINE CONDITION $\omega = 15.1°$
DS ——— d
DT ----- d
-5.0  5.0
ASTIGMATISM $\omega = 15.1°$
-0.5  0  0.5
DISTORTION %

5,633,758

VARIABLE MAGNIFICATION LENS SYSTEM

BACKGROUND OF THE INVENTION

1. Field of the Invention

The present invention relates to a variable magnification lens system, and more specifically relates to a variable magnification lens system for use in copying machines for copying at 0.5–2 magnification.

2. Description of the Related Art

Conventional variable magnification lens systems are known to comprise a positive first lens unit and a negative second lens unit.

Conventional variable magnification lens systems, however, cannot adequately correct curvature of field and off-axial astigmatism, and therefore cannot achieve a wide angle with a few lens elements. Furthermore, conventional constructions make it difficult to provide the copy machine in compact form.

SUMMARY OF THE INVENTION

A main object of the present invention is to eliminate the previously mentioned disadvantages by providing a variable magnification lens system capable of achieving a wide angle with a few lens elements while maintaining excellent optical characteristics.

Another object of the present invention is to provide a variable magnification lens system for copying which allows a compact copying machine design.

These and other objects are achieved by providing a variable magnification lens system having a construction of four-layers and two lens units arranged sequentially from the object side:

- a positive first lens unit comprising a negative first lens element and a positive second lens element, and negative second lens unit comprising a positive third lens element and a negative fourth lens element;
- wherein, at variable magnification from an equal magnification (1:1) state to an enlargement state, the overall lens system moves while the spacing between said two lens units is increased, and the distance between the object and the image remains constant;
- an aspherical surface is provided on at least one surface of the first lens unit and at least one surface of the second lens unit;
- a concave surface is provided on the document side surface of the first lens element and on the image side surface of the fourth lens element; and
- the focal lengths of the first lens element and fourth lens element are suitable stipulated.

These and other objects, features, aspects and advantages of the present invention will be apparent from the following detailed description thereof taken in conjunction with the accompanying drawings.

DESCRIPTION OF THE PREFERRED EMBODIMENTS

Optical systems for copying require space for conjugate length. Accordingly, the entire optical system can be rendered more compact if the conjugate length is reduced by reducing the focal length of the lens system. When the front side principal point is near the center of the lens system, however, shortening of the focal length is restricted by the need to prevent contact and interference between the slider and the lens system during scanning movement.

The variable magnification lens system of the present invention is a two-unit zoom lens comprising a first lens unit having positive refractive power, and a second lens unit having negative refractive power, wherein the empty space between said first and second lens units increases during variable magnification from an equal magnification state to a enlargement state. Thus, the arrangement of the overall lens in the enlargement state is a telephoto type viewed from the document side, and the front side principal point of the overall system is on the document side relative to the entire lens system. Therefore, the front length of the lens in the enlargement state can be increased, and the overall size of the copying machine in which the lens is used can be rendered more compactly by reducing the focal length f.

The variable magnification lens system of the present invention can effectively correct off-axial astigmatism and curvature of field at relatively wide angles despite its slight four-lens construction because the negative lenses included in the first lens unit and the second lens unit is arranged on the outer side within the overall lens system.

Figure 9:
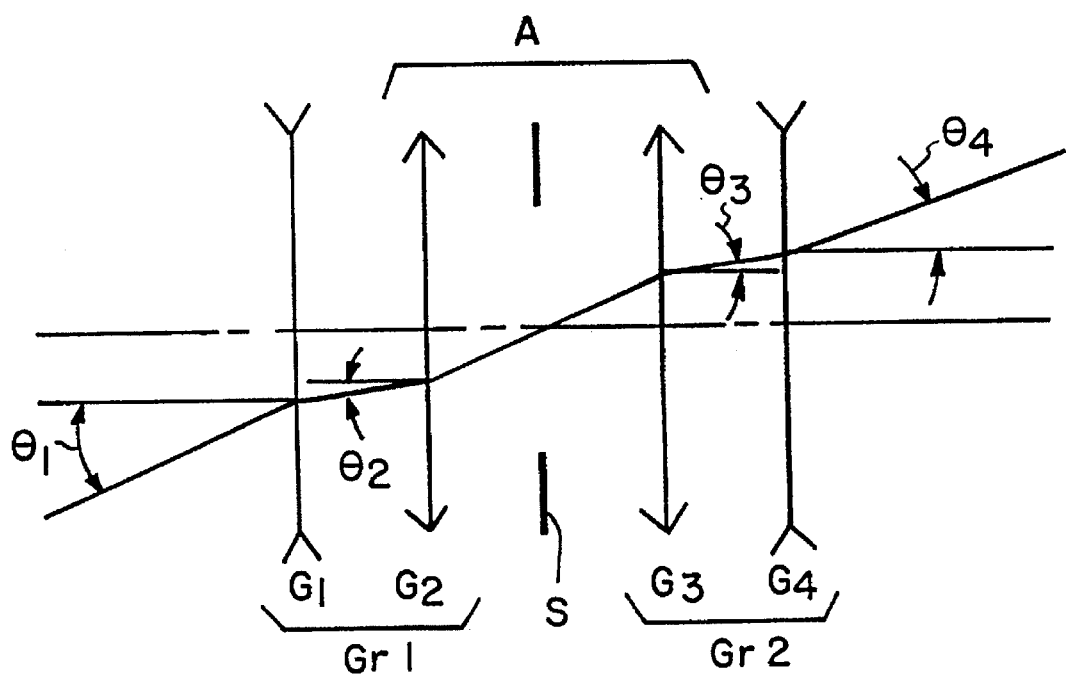
FIG. 9 shows the power configuration of the present invention.

The aforesaid corrections are discussed in detail hereinafter with reference to FIG. 9. In the drawing, fourth lens G4 and first lens G1 are negative lenses and are positioned on the exterior sides of first lens unit Gr1 and second lens unit Gr2. Accordingly, the angles θ2 and θ3 of the light rays entering and exiting positive lens block A are small even at wide angles (when angles θ1 and θ4 are large), such that off-axial astigmatism is effectively corrected.

If negative lenses are arranged on the object side in the first lens unit Gr1 and on the image side in the second lens unit Gr2, off-axial astigmatism and curvature of field can be effectively corrected. In a finite conjugate system including 1:1 magnification as in lenses used for copying, it is beneficial in correcting astigmatism and curvature of field if the surface of the negative lens of first lens unit Gr1 (first lens G1) on the object side, and the surface of the negative lens of second lens unit Gr2 (fourth lens G4) on the image side are concave surfaces.

If the surface on the object side of the negative lens G4 of the second lens unit Gr2 are concave, the negative power of said second lens unit Gr2 is increased, thereby minimizing the amount of change in the spacing between units when zooming, while also rendering a more compact lens system. On the other hand, if fourth lens G4 faces a concave surface on the image side, astigmatism and curvature of field can be corrected even in the case of a negative meniscus lens, but in such instances the negative power of second lens unit Gr2 is reduced, and it is difficult to render the overall lens system in compact form due to the large amount of fluctuation of the empty space between first lens unit Gr1 and second lens unit Gr2 when zooming.

In order to realize ω=20°, F No./10, and magnification of 0.5×–2× in four-lens construction, one or more surfaces (preferably two surfaces) of each unit must be an aspherical surface. The location of the aspherical surface(s) provided in each lens unit is not limited to the first lens G1 and third lens G3 as described in the embodiment described later.

The present invention satisfies condition (1) below.

$$1.5 < |(f_I * f_1)/(f_{II} * f_4)| < 2.5 \tag{1}$$

Where the following definitions obtain:

$f_I$: first lens unit focal length $f_{II}$: second lens unit focal length $f_1$: first lens focal length $f_4$: fourth lens focal length The lens of the present invention possesses a power configuration satisfying condition (1), and therefore allows reduction of total lens length as well as reduction of the lens major diameter compared to copying lenses of the same focal length. The lens system of the present invention further reduces the fluctuation in distortion. When the upper limit of condition (1) is exceeded, the lens cannot be produced in compact form, whereas when the lower limit is exceeded, distortion fluctuation cannot be suppressed.

Tables 1 and 2 below describe embodiments of the variable magnification lens used for copying of the present invention. In each embodiment, ri (i=1, 2, 3, ....) expresses the radius of curvature of surface No.i counting from the object side; di expresses the axial spacing of surface No.i counting from the object side; Ni(i=1, 2, 3, ....) and vi (i=1, 2, 3, ....) respectively express the refractive index and Abbe number of lens No.i counting from the object side relative to d-line; f expresses the total focal length of at magnifications of 0.5×–1×–2×; F-No. expresses the F-number; and ω expresses the half angle. Values corresponding to condition (1) are expressed for each embodiment.

In each embodiment, surfaces indicated with an asterisk (*) mark in the radius of curvature field are constructed as aspherical surfaces. Aspherical surfaces are expressed by the following equation.

$$X = \frac{C \cdot Y^2}{1 + \sqrt{1 - \epsilon \cdot Y^2 \cdot C^2}} + \sum_i A_i Y^i$$

Where the following definitions obtain.

X: amount of displacement from the standard surface in the optical axis direction Y: height perpendicular to the optical axis C: paraxial curvature ε: quadratic curve parameter Ai: aspherical coefficient of degree i (i=4, 6, 8, 10)

TABLE 1

First Embodiment $f = 185.5 ~ 209.6 ~ 185.5$
$F No = 9.0 ~ 10.2 ~ 9.0$
$ω = 15.1 ~ 19.7 ~ 15.1 (°)$

| Radius of curvature | | Axial spacing | | Refractive index | | Abbe No. | |
|---|---|---|---|---|---|---|---|
| r1* | −37.14 | | | | | | |
| | | d1 | 5.0 | N1 | 1.8467 | v1 | 23.8 |
| r2* | −63.02 | | | | | | |
| | | d2 | 4.1 | | | | |
| r3 | 109.02 | | | | | | |
| | | d3 | 10.0 | N2 | 1.6710 | v2 | 51.7 |
| r4 | −53.52 | | | | | | |
| | | d4 | 4.8 | | | | |
| r5 (diaphragm) | ∞ | | | | | | |
| | | d5 | 12.000~6.268~12.000 | | | | |
| r6 | −169.72 | | | | | | |
| | | d6 | 7.0 | N3 | 1.7440 | v3 | 44.9 |
| r7 | −41.39 | | | | | | |
| | | d7 | 4.0 | | | | |
| r8 | −39.28 | | | | | | |
| | | d8 | 3.5 | N4 | 1.7810 | v4 | 44.6 |
| r9 | 201.73 | | | | | | |

[Aspherical coefficient]

r1: ε = 1.0000
A4 = 0.16243 × 10⁻⁵
A6 = 0.14036 × 10⁻⁷
A8 = −0.34440 × 10⁻¹⁰
A10 = 0.24490 × 10⁻¹³
r2: ε = 1.0000
A4 = 0.30250 × 10⁻⁵
A6 = 0.66090 × 10⁻⁸
A8 = 0.31680 × 10⁻¹¹
A10 = −0.23238 × 10⁻¹³
r6: ε = 1.0000
A4 = −0.56352 × 10⁻⁶
A6 = −0.38620 × 10⁻⁸
A8 = 0.10952 × 10⁻¹⁰
A10 = −0.64432 × 10⁻¹⁴
[Condition (1)]
$(f_I \cdot f_1)/(f_{II} \cdot f_4) = 2.081$

TABLE 2

Second Embodiment $f = 184.5 ~ 208.4 ~ 184.5$
$F No = 9.0 ~ 10.2 ~ 9.0$
$ω = 15.1 ~ 19.7 ~ 15.1 (°)$

| Radius of curvature | | Axial spacing | | Refractive index | | Abbe No. | |
|---|---|---|---|---|---|---|---|
| r1* | −39.78 | | | | | | |
| | | d1 | 5.1 | N1 | 1.8467 | v1 | 23.8 |
| r2* | −68.84 | | | | | | |
| | | d2 | 8.1 | | | | |
| r3 | 123.49 | | | | | | |
| | | d3 | 10.3 | N2 | 1.6710 | v2 | 51.7 |
| r4 | −53.99 | | | | | | |
| | | d4 | 4.9 | | | | |
| r5 (diaphragm) | ∞ | | | | | | |
| | | d5 | 12.505~6.545~12.505 | | | | |
| r6 | −169.51 | | | | | | |
| | | d6 | 7.2 | N3 | 1.7440 | v3 | 44.9 |
| r7 | −43.39 | | | | | | |
| | | d7 | 4.6 | | | | |
| r8 | −39.84 | | | | | | |
| | | d8 | 3.5 | N4 | 1.7856 | v4 | 42.8 |
| r9 | 263.81 | | | | | | |

[Aspherical surface coefficient]

r1: ε = 1.0000
A4 = 0.22489 × 10⁻⁵
A6 = 0.15782 × 10⁻⁷
A8 = −0.30967 × 10⁻¹⁰
A10 = −0.32367 × 10⁻¹⁴
r2: ε = 1.0000

TABLE 2-continued

Second Embodiment f = 184.5~208.4~184.5
F No = 9.0~10.2~9.0
ω = 15.1~19.7~15.1 (°)

| Radius of curvature | Axial spacing | Refractive index | Abbe No. |
|---|---|---|---|
| A4 = 0.36399 × 10$^{-5}$ | | | |
| A6 = 0.91574 × 10$^{-8}$ | | | |
| A8 = 0.61421 × 10$^{-11}$ | | | |
| A10 = −0.56769 × 10$^{-13}$ | | | |
| r6: ε = 1.0000 | | | |
| A4 = −0.47504 × 10$^{-6}$ | | | |
| A6 = −0.12528 × 10$^{-8}$ | | | |
| A8 = 0.11014 × 10$^{-10}$ | | | |
| A10 = −0.54139 × 10$^{-13}$ | | | |
| [Conditional equation (1)] | | | |
| $(f_I \cdot f_1)/(f_{II} \cdot f_4) = 2.003$ | | | |

Figure 1:
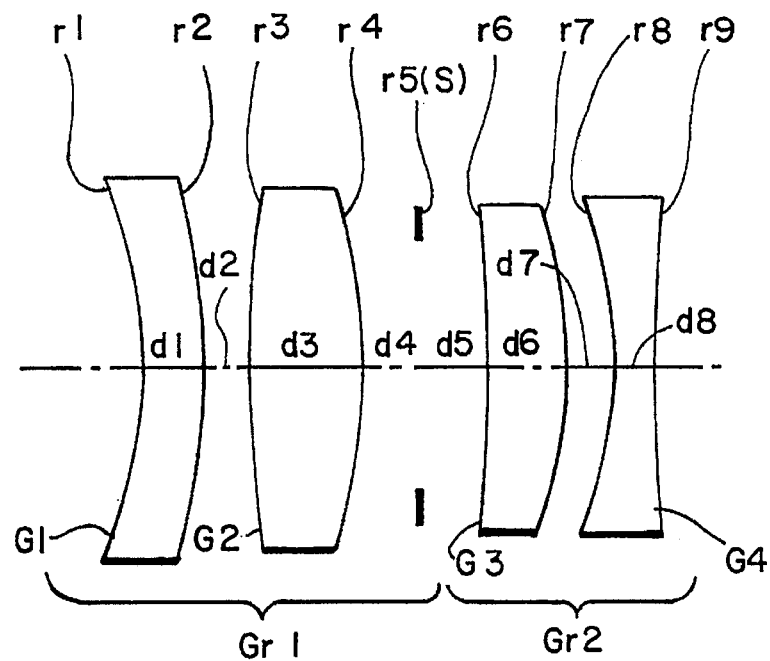
FIG. 1 shows the construction of a first embodiment of the lens of the present invention.
Figure 2:
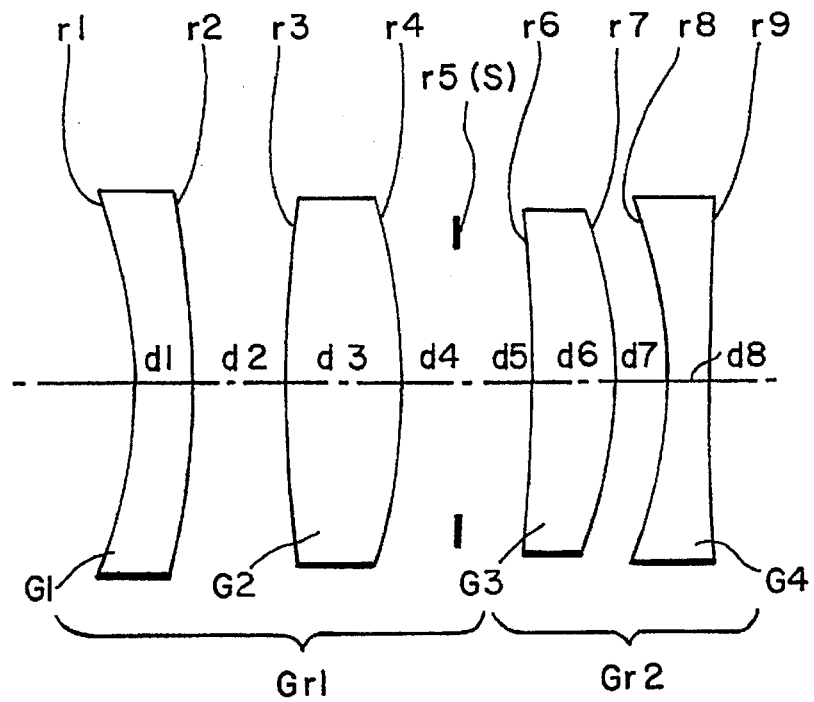
FIG. 2 shows the construction of a second embodiment of the lens of the present invention.

FIGS. 1 and 2 respectively show lens constructions of first and second embodiments in the variable magnification state. Embodiments 1 and 2 comprise positive first unit Gr1 and negative second unit Gr2. First unit Gr1 comprises, sequentially from the object side, negative meniscus lens (first lens G1) which is concave on the object side, positive lens (second lens G2) which is biconvex, and diaphragm (S). Second unit Gr2 comprises, sequentially from the object side, positive meniscus third lens (G3) which is convex on the image side, and negative lens (fourth lens G4) which is biconcave.

Figure 3A:
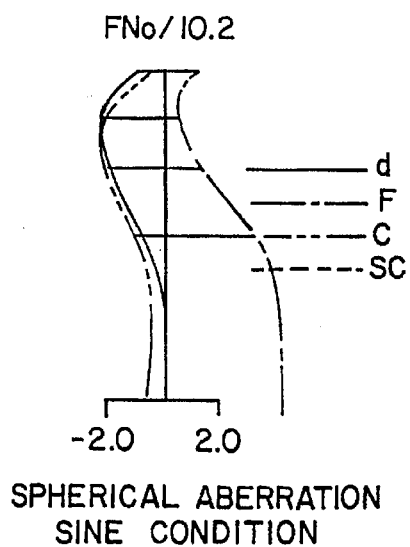
FIGS. 3A–3C illustrate aberration at 1.0 magnification of the first embodiment.
Figure 3B:
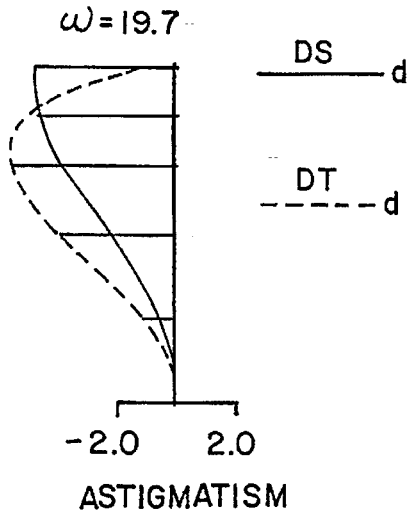
Figure 3C:
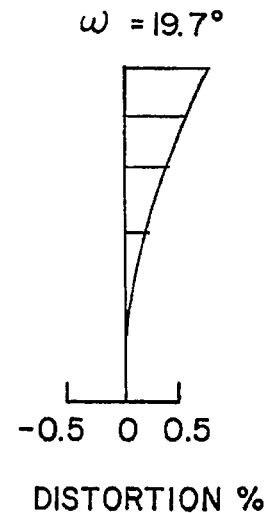
Figure 4A:
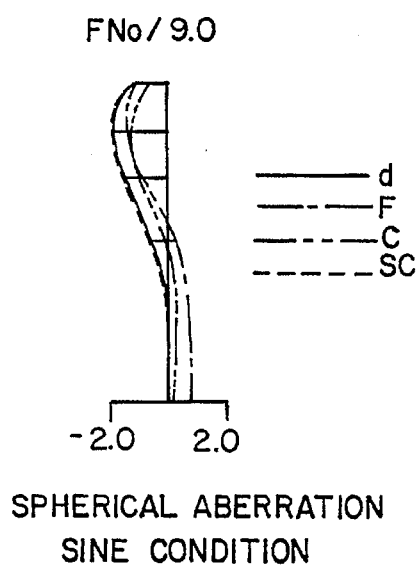
FIGS. 4A–4C illustrate aberration at 0.5 magnification of the first embodiment.
Figure 4B:
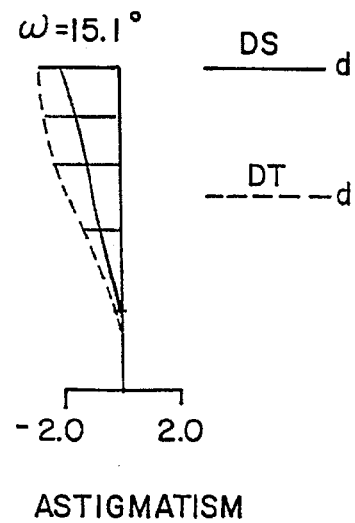
Figure 4C:
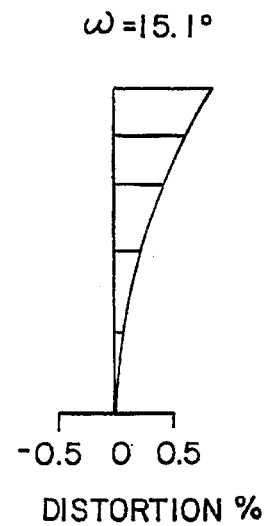
Figure 5A:
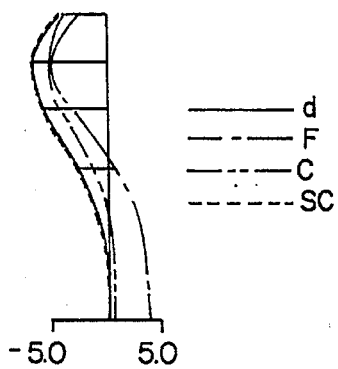
FIGS. 5A–5C illustrate aberration at 2.0 magnification of the first embodiment.
Figure 5B:
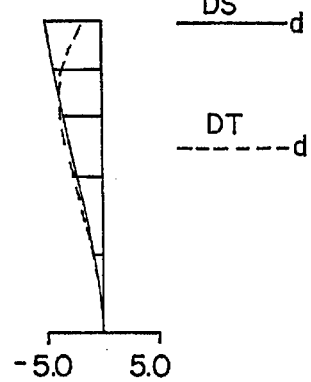
Figure 5C:
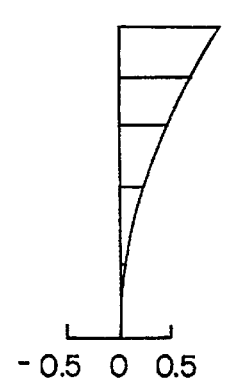
Figure 6A:
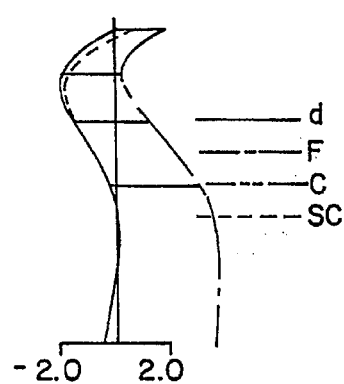
FIGS. 6A–6C illustrate aberration at 1.0 magnification of the second embodiment.
Figure 6B:
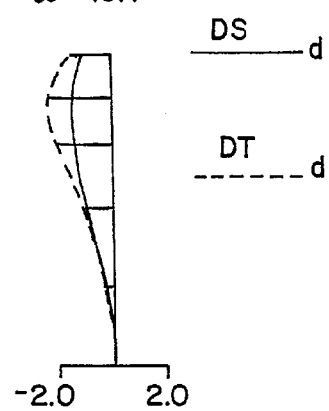
Figure 6C:
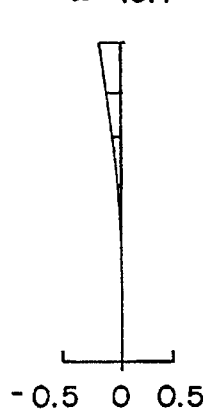
Figure 7A:
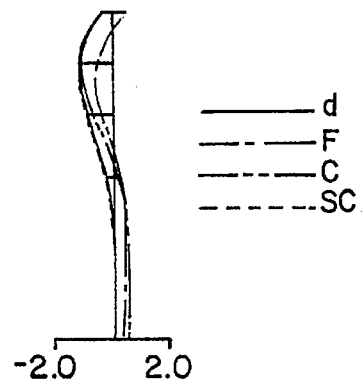
FIGS. 7A–7C illustrate aberration at 0.5 magnification of the second embodiment.
Figure 7B:
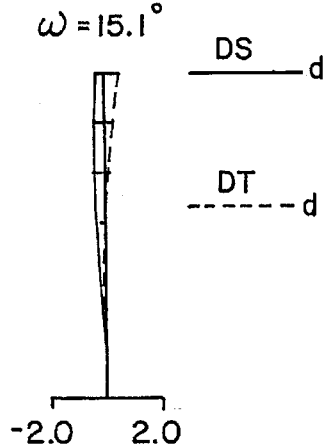
Figure 7C:
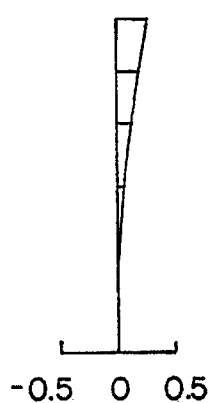
Figure 8A:
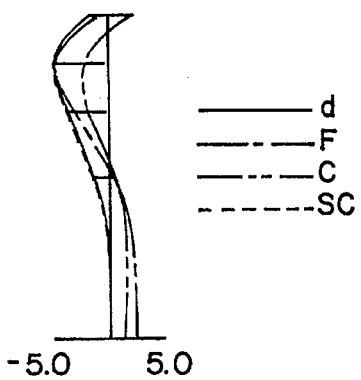
FIGS. 8A–8C illustrate aberration at 2.0 magnification of the second embodiment.
Figure 8B:
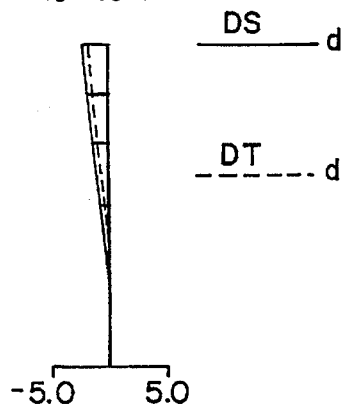
Figure 8C:
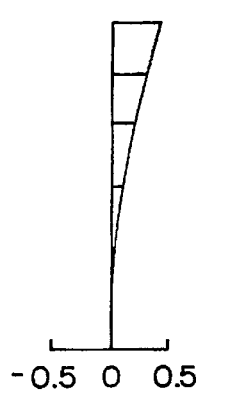

FIGS. 3–5 show aberration relative to the first embodiment, and FIGS. 6–8 show aberration relative to the second embodiment. FIGS. 3A–3C and FIGS. 6A–6C show aberration at 1:1 magnification (1.0×); FIGS. 4A–4C and FIGS. 7A–7C show aberration at reduced magnification (0.5×); and FIGS. 5A–5C and FIGS. 8A–8C show aberration at enlarged magnification (2.0×). In the drawings, reference symbols d, F, and C represent aberration relative to d-line, F-line, and C-line, respectively; DS and DT represent aspherical aberration at sagittal surface and tangential surface, respectively; and SC represents the sine condition.

In the first and second embodiments, offaxial distortion and astigmatism are corrected by providing aspherical surfaces on both surfaces of first lens G1 furthest from the pupil to effectively correct distortion of the entire system. Furthermore, spherical aberration and paraxial coma are corrected by providing an aspherical surface on third lens (G3) relatively near the pupil. Table 3 shows each aspherical surface relative to distortion correction in the direction of deviation from the spherical surface of each aspherical surface.

TABLE 3

| Surface No. | Deviation direction | Action |
|---|---|---|
| r1 | direction of negative power reduction | corrects distortion, astigmatism |
| r2 | direction of positive power reduction | corrects distortion, astigmatism |
| r6 | direction of negative power reduction | corrects spherical distortion, paraxial coma |

A negative lens is provided on the exterior side of each lens unit in the positive and negative four-lens two-unit constructions of both embodiments. That is, the various aberrations are suitably suppressed because at least one surface of each unit is an aspherical surface, as can be readily understood from the aberration illustrations of FIGS. 3 and 4.

The present invention maintains optical performance and provides wide angle performance using a minimal four-lens construction by providing first and fourth lenses with negative refractive power in the exterior side of the system, providing an aspherical surface on at least one surface of the first lens unit and one surface of the second lens unit. The aforesaid construction is effective in correcting coma and curvature of field by providing a concave surface on the document side of the first lens and on the image side of the fourth lens. In magnification from the equal (1:1) magnification state to the enlargement state, the lens front distance in the enlargement state is increased due to the positive/negative two unit construction which increases the spacing between the two units, thereby allowing the copying machine to be made more compact. Since the aforesaid construction satisfied conditional equation (1), aberration fluctuation is minimized, so as to realize a compact variable magnification lens having small lens diameter and short overall lens length compared to camera lenses of the same type. Thus, a copying machine can be rendered ever more compact in form.

Although the present invention has been described and illustrated in detail, it is clearly understood that the same is by way of illustrations and samples only and is not to be taken by way of limitation, the spirit and scope of the present invention being limited only by the terms of the appended claims.

What is claimed is:

1. A variable magnification lens system, comprising from the object side:

a positive first lens unit including a negative first lens element and a positive second lens element, and a negative second lens unit including a positive third lens element and a negative fourth lens element;

wherein, at variable magnification from an equal magnification state to an enlargement state, the overall lens system moves while the spacing between said two lens units is increased, and the distance between the object and the image remains constant;

an aspherical surface is provided on at least one surface of the first lens unit and at least one surface of the second lens unit;

a concave surface is provided on the object side surface of the first lens element and on the image side surface of the fourth lens element; and a following condition is fulfilled:

$$1.5 < |(f_I {}^* f_1)/(f_{II} {}^* f_4)| < 2.5$$

where the following definitions obtain:

$f_I$: first lens unit focal length
$f_1$: first lens element focal length
$f_{II}$: second lens unit focal length
$f_4$: fourth lens element focal length.

2. A variable magnification lens system according to claim 1, wherein the surface on the object side of said fourth lens element is concave.

3. A variable magnification lens system according to claim 1, wherein aspherical surfaces are provided on both sides of said first lens element.

4. A variable magnification lens system according to claim 1, wherein the surface on the image side of said third lens element is aspherical.

5. A variable magnification lens system according to claim 1, wherein the variable magnification lens system consists of said first lens unit, a diaphragm, and said second lens unit.

6. A variable magnification lens system according to claim 1, wherein the first lens element is arranged in the object side end of the system, and the second lens unit is arranged in the image side end of the system.

7. A variable magnification lens system, essentially consisting of from the object side:

a positive first lens unit including a negative first lens element and a positive second lens element, and a negative second lens unit including a positive third lens element and a negative fourth lens element;

wherein, at variable magnification from an equal magnification state to an enlargement state, the overall lens system moves while the spacing between said two lens units is increased, and the distance between the object and the image remains constant;

an aspherical surface is provided on at least one surface of the first lens unit and at least one surface of the second lens unit;

a concave surface is provided on the object side surface of the first lens element and on the image side surface of the fourth lens element; and a following condition is fulfilled:

$$1.5 < |(f_I * f_1)/(f_{II} * f_4)| < 2.5$$

where the following definitions obtain:
$f_I$: first lens unit focal length
$f_1$: first lens element focal length
$f_{II}$: second lens unit focal length
$f_4$: fourth lens element focal length.

8. A variable magnification lens system according to claim 7, wherein the surface on the object side of said fourth lens element is concave.

9. A variable magnification lens system according to claim 7, wherein aspherical surfaces are provided on both sides of said first lens element.

10. A variable magnification lens system according to claim 7, wherein the surface on the image side of said third lens element is aspherical.

11. A variable magnification lens system, consisting of from the object side:

a positive first lens unit including a negative first lens element, a positive second lens element, and a diaphragm, and a negative second lens unit including a positive third lens element and a negative fourth lens element;

wherein, at variable magnification from an equal magnification state to an enlargement state, the overall lens system moves while the spacing between said two lens units is increased, and the distance between the object and the image remains constant;

an aspherical surface is provided on at least one surface of the first lens unit and at least one surface of the second lens unit;

a concave surface is provided on the object side surface of the first lens element and on the image side surface of the fourth lens element; and a following condition is fulfilled:

$$1.5 < |(f_I * f_1)/(f_{II} * f_4)| < 2.5$$

where the following definitions obtain:
$f_I$: first lens unit focal length
$f_1$: first lens element focal length
$f_{II}$: second lens unit focal length
$f_4$: fourth lens element focal length.

12. A variable magnification lens system according to claim 11, wherein the surface on the object side of said fourth lens element is concave.

13. A variable magnification lens system according to claim 11, wherein aspherical surfaces are provided on both sides of said first lens element.

14. A variable magnification lens system according to claim 11, wherein the surface on the image side of said third lens element is aspherical.

* * * * *